United States Patent [19]
Rojlar

[11] Patent Number: 4,582,192
[45] Date of Patent: Apr. 15, 1986

[54] CONVEYOR WITH TWIN BELT SYNCHRONIZING MECHANISM

[75] Inventor: Hans Y. V. Rojlar, JuniBacken, Sweden

[73] Assignee: Lars Helmersson, San Diego, Calif.

[21] Appl. No.: 665,545

[22] Filed: Oct. 26, 1984

[51] Int. Cl.⁴ .................................................. B65G 23/00
[52] U.S. Cl. ...................................... 198/575; 198/577; 198/817; 198/810
[58] Field of Search ............... 198/502, 575, 810, 817, 198/855, 577; 474/11, 49, 50, 51, 56, 57, 70; 226/175

[56] References Cited

U.S. PATENT DOCUMENTS 4,295,836 10/1981 Kumm .................................. 474/51
4,366,900 1/1983 Johansson ....................... 198/817 X Primary Examiner—Joseph E. Valenza
Assistant Examiner—Lyle Kim
Attorney, Agent, or Firm—Baker, Maxham & Jester

[57] ABSTRACT

A conveyor for building and other material transport has a pair of parallel spaced apart belts with upstanding load engaging pushers. A belt synchronizing mechanism is provided to maintain the transverse alignment of the pushers. Reed switches sense magnetic position indicators on the belts. A control circuit including the reed switches selectively moves spacer arms into and out of engagement with the belt drive pulleys to vary the circumference thereof and vary the speed of travel of each of the belts.

9 Claims, 5 Drawing Figures

CONVEYOR WITH TWIN BELT SYNCHRONIZING MECHANISM

BACKGROUND OF THE INVENTION

The present inventions relates to material handling apparatus, and more particularly, to a lightweight, portable conveyor having parallel endless belts with upstanding pushers for lifting building materials onto rooftops.

Residential construction frequently involves the lifting of substantial amounts of heavy building materials, such as tiles, tarpaper, shingles and the like onto roofs. It is inefficient to do this by manual labor. The high cost of forklifts and other heavy lifting machinery, along with their requirement for skilled operators, makes such equipment undesirable for many residential construction projects. Also, accidents can occur when heavy lifting equipment is used to lift large loads onto rooftops.

U.S. Pat. No. 4,366,900 discloses a portable, lightweight conveyor capable of carrying substantial amounts of building materials onto rooftops in a short amount of time. It includes a telescopic frame which can be collapsed during transportation and pulled out to its full length for operation. A pair of endless belts are entrained about pulleys rotatably mounted at opposite ends of the frame so that the belts can travel about the pulleys in spaced apart parallel relationship. The pulleys at the rearward, lower end of the frame are driven by an electric motor through a gear reduction mechanism. Due to tolerance variations, the pulleys do not have identical diameters and the belts do not have identical lengths, although these dimensions are made as close to each other as is practical under the circumstances. Therefore, when the pulleys at the rearward end of the frame are driven at the same rotational speed, upstanding load retaining pushers or cleats on the belts tend to move away from transverse alignment. Obviously, if misalignment becomes too severe, loads cannot be properly retained by the pushers and will fall off of the conveyor.

To solve the foregoing problem, U.S. Pat. No. 4,366,900 includes a mechanism for synchronizing the movement of the two belts to maintain the load retaining pushers directly opposite each other. Specifically, magnetic position indicators on the belts are sensed by a control circuit which selectively actuates clutch couplings to briefly stop either drive pulley so that the other belt can catch up. While this conveyor is a servicable apparatus and represents an improvement over previous conveyors, the clutch couplings are complex, expensive and subject to failure as a result of excessive wear. Also, the momentary stopping of a drive pulley tends to be abrupt and can dislodge loads from the belts.

Accordingly, it would be desirable to provide a portable, lightweight conveyor of the twin belt type having an improved belt synchronizing mechanism. If the belts were to be permanently connected by longitudinally spaced links, the belts would still tend to travel at uneven speeds, resulting in unwanted drag on the pulleys on one side of the conveyor and a skewing of the transverse links. The use of such links would also dictate that no support beams, control mechanisms, rails, etc. could extend between the belts.

Substitution of a single wide belt for the twin belts is also not a desirable solution. Such belts tend to be heavy and expensive. Generally the control and driving mechanisms must be mounted within the confines of a single wide belt.

Driving each of the separate rear pulleys at different rotational speeds is also not desirable. First of all, to be economical, such a portable conveyor should use a standard AC induction motor. The RPM of such a motor can only be varied through expensive and complex electronic circuitry. Any mechanism for independently varying the speeds of the two drive pulleys to synchronize the belts would be undesirably complex.

The use of twin metal drive chains and sprockets in place of belts and pulleys is also not desirable. Such chains are heavy and expensive. They cannot readily be removed and folded when the telescopic frame of the conveyor is collapsed. Twin rubber timing belts with pulleys and teeth are also not desirable. Such rubber timing belts are also expensive. Furthermore, such belts have a tendency to stretch an unacceptable amount when the telescopic frame is extended and the belts tensioned with the forward crank and screw mechanism.

SUMMARY OF THE INVENTION

Accordingly, it is the primary object of the present invention to provide an improved conveyor.

Another object of the present invention is to provide an improved conveyor of the portable type.

Another object of the present invention is to provide a conveyor of the twin belt type with an improved mechanism for synchronizing the travel of the two belts.

A conveyor for building and other material transport has a pair of parallel spaced apart belts with upstanding load engaging pushers. A belt synchronizing mechanism is provided to maintain the transverse alignment of the pushers. Reed switches sense magnetic position indicators on the belts. A control circuit including the reed switches selectively moves spacer arms into and out of engagement with the belt drive pulleys to vary the circumference thereof and vary the speed of travel of each of the belts.

DESCRIPTION OF THE PREFERRED EMBODIMENT

To the extent necessary, the disclosure of the aforementioned U.S. Pat. No. 4,366,900 is specifically incorporated herein by reference to complete the disclosure of the subject application.

Figure 1:
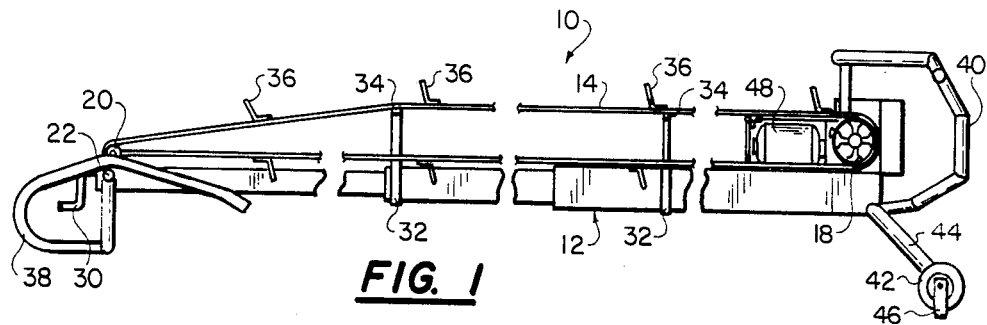
FIG. 1 is a simplified side elevation view, broken away, illustrating a preferred embodiment of my conveyor.

FIG. 1 illustrates a preferred embodiment 10 of my conveyor. In this view, the conveyor has been broken apart and shortened for the sake of clarity. The conveyor includes a central frame or body 12 which consists of three parts which can be pushed into each other telescopically in order to facilitate transportation from one erection site to another. In its extended configuration, the three parts of the frame are locked to each other by means of pins or bolts not illustrated in FIG. 1. By way of example, the frame 12 may be made of aluminum box beams and may have an operational length of approximately 35 feet, and a stored length of approximately 16 feet.

Figure 2:
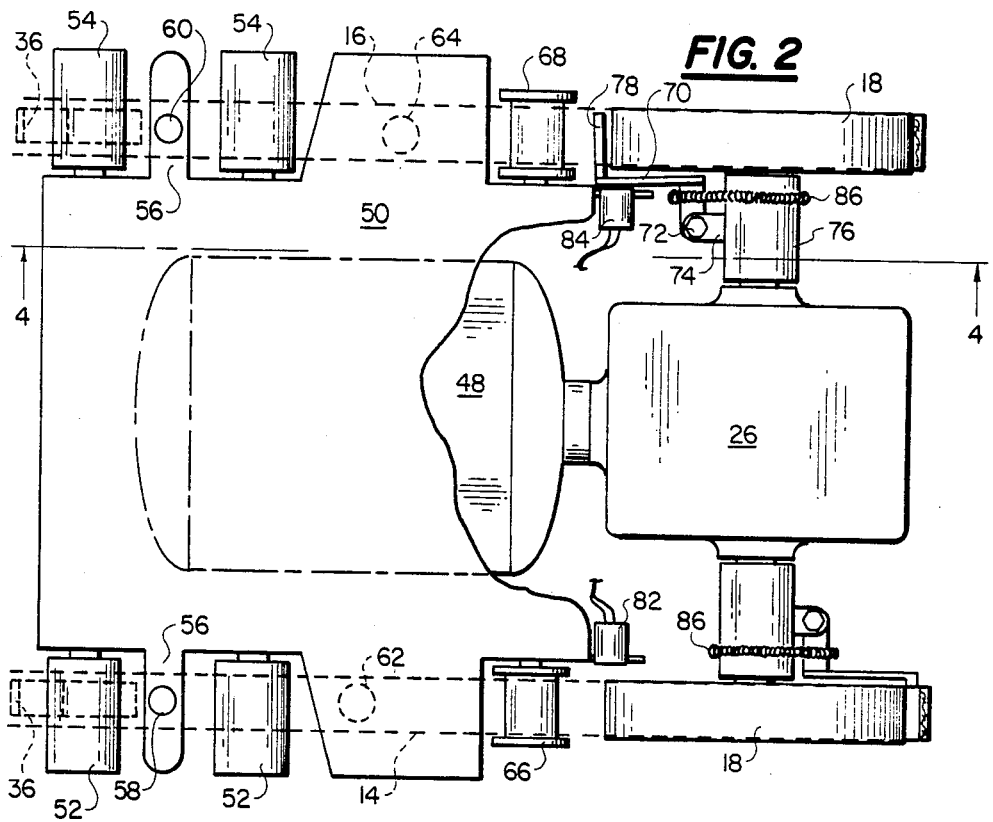
FIG. 2 is a greatly enlarged, top plan view illustrating the belt drive and synchronizing mechanisms of the preferred embodiment of my conveyor.

Referring to FIGS. 1 and 2, the conveyor includes a pair of endless belts 14 and 16 supported so that they can travel around corresponding drive and return pulleys 18 and 20, respectively, in spaced apart, parallel relationship. Thus, the drive pulleys 18 rotate about a first axis which is spaced from, and parallel to, a second axis about which the return pulleys 20 rotate. The return pulleys 20 freely rotate about an axle 22 (FIG. 1) journaled at the forward end of the frame 12. The drive pulleys 18 are each rigidly secured to opposite ends of an axle 24 (FIG. 3) which extends through a gear reduction housing 26 (FIG. 2). Keys 28 (FIG. 3) fit in corresponding recesses in the drive pulley hubs and drive axles to provide non-slip, rigid couplings.

The twin belts 14 and 16 may be made of strong, relatively narrow strips of woven NYLON, and may for example have a width of approximately three to ten centimeters. A crank 30 (FIG. 1) may be turned to actuate a screw mechanism (not illustrated) to gradually extend the forwardmost part of the frame 12 and thereby place the belts 14 and 16 under substantial tension. Brackets 32 are welded or otherwise connected to the frame at suitable intervals. The brackets extend perpendicularly upward from the frame and their ends support upwardly diverging pairs of rollers 34 which in turn support and guide the upper segments of each of the belts. Upstanding load-retaining pushers or cleats 36 (FIG. 1) are attached to the belts at suitable intervals, there being an equal number of such pushers on each belt spaced equal distances along each belt. The pushers may comprise generally L-shaped pieces of metal, the lower, shorter legs of which are riveted or otherwise rigidly secured to the belts.

Guardrails 38 and 40 (FIG. 1) are mounted to the forward and rearward ends of the frame 12. Wheels 42 are rotatably mounted to legs 44 which extend from the rearward guardrail 40. Stop chocks 46 are pivotably mounted to each leg and surround each wheel. These chocks may be moved into positions to elevate the wheels off of the ground and thereby anchor the lower end of the frame.

Figure 4:
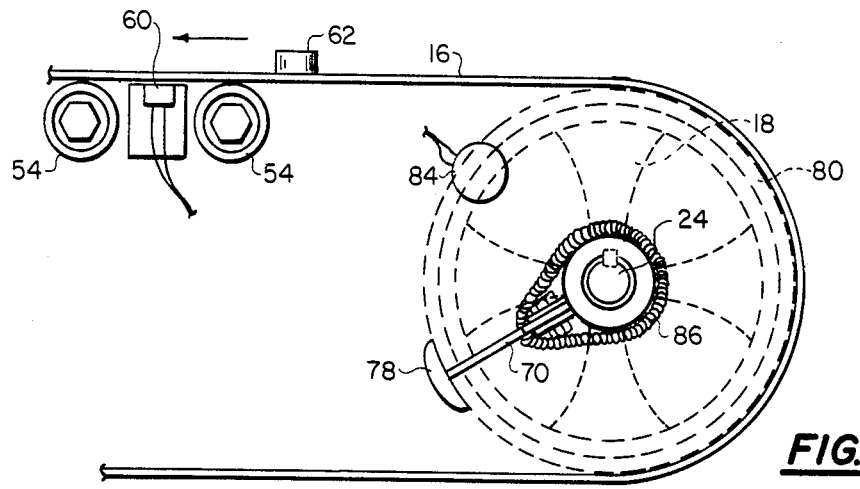
FIG. 4 is an enlarged side elevation view of the right belt and drive pulley taken along line 4—4 of FIG. 2. The right drive pulley is shown in phantom lines and the cam of the right spacer arm is shown engaged with the right drive pulley but clear of the right belt.

Referring to FIG. 2, an electric motor 48, of the AC induction type, is mounted to the frame and is drivingly coupled to the drive pulleys 18 through the gear reduction mechanism 26. A pallet 50 extends horizontally above the motor 48 and is mounted to the frame. This pallet provides a support surface for stabilizing loads as they are placed on top of the belts in advance of an opposing pair of pushers 36. Pairs of guide rollers 52 and 54 are mounted on opposite sides of the pallet for supporting the belts 14 and 16. Support fingers 56 extend from opposite sides of the pallet 50 between the rollers of the pairs 52 and 54, respectively. Magnetically actuated reed switches 58 and 60 (FIGS. 2, 4 and 5) are mounted on corresponding ones of the fingers 56 for sensing magnetic position indicators 62 and 64 as they pass by the fingers. The position indicators may be permanent magnets bolted to the belts at locations spaced a short equal distance behind corresponding ones of the pushers 36. Each belt preferably has at least three magnetic position indicators. For reasons that will become more apparent hereafter, the more position indicators on each belt, the more often the positions of the belts will be sensed for adjustment.

As illustrated in FIG. 2, guide rollers 66 and 68 engage and feed the lower segments of each of the belts 14 and 16 to the perimeter of their respective drive pulleys 18.

Each of the drive pulleys 18 is provided with the means for selectively increasing and decreasing its circumference. Specifically, referring to FIG. 2 a L-shaped arm 70 has its shorter leg pivotally connected by bolt 72 to a flange 74 rigidly connected to a collar 76. The collar 76 surrounds, and is freely rotatable about the axle 24. A cam 78 is connected to the outer end of the longer segment of the L-shaped arm 70. Each drive pulley 18 preferably has an outer cover 80 made of a resilient, deformable material such as synthetic rubber. The cover increases the amount of friction between the drive pulley and the belt and also between the cam and the drive pulley.

Figure 3:
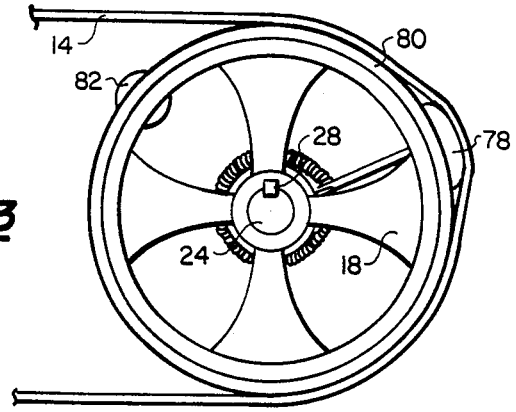
FIG. 3 is an enlarged side elevation view of the left belt, drive pulley taken from the bottom of FIG. 2. This view illustrates the cam of the left spacer arm engaged between the left drive pulley and belt.

Each cam 78 (FIG. 3) has an inner curved surface with a radius of curvature corresponding to the radius of curvature of the outer surface of the resilient cover 80. This facilitates smooth, non-slip engagement of the inner surface of the cam with the pulley. The outer surface of each cam 78 is also curved to facilitate the travel of a belt around both the drive pulley and the cam as illustrated in FIG. 3.

As illustrated in FIG. 2, electromagnets 82 and 84 are mounted to the pallet 50 or other supporting structure for each pulling one of the adjacent arms 70 inwardly away from its corresponding drive pulley. Thus, energization of either one of the electromagnets will pull the cam of the corresponding spacer arm away from the corresponding drive pulley between the upper and lower segments of the corresponding belt in the area of the drive pulley which is not engaged by the belt. Coil springs 86 extend around each collar 76 and pull inwardly on the inner leg of the corresponding arm 70. Thus, each spacer arm is pivotally biased to move its corresponding cam into engagement with its corresponding drive pulley. Accordingly, considering either half of the drive mechanism, when the electromagnet thereof is not energized, the cam 78 is held against the resilient outer covering 80 of the drive pulley. Since the collar 76 is mounted for rotation around the same axis as the drive pulley, the cam rotates in a circular path in a fixed location on the outer circumference of the drive pulley. The belt rides around the drive pulley as illustrated in FIG. 3. This effectively increases the circumference or outer perimeter dimension of the drive pulley. It can thus be seen that if only one of the cams is rotating with its associated drive pulley, the belt being driven by that pulley will travel at a greater rate of speed relative to the other belt. This action is utilized in synchronizing the movement of the two belts. If, as the cam is traveling around the drive pulley the corresponding electromagnet is then energized, as soon as the outer leg of the arm passes over the electromagnet the arm will be pivoted inwardly against the electromagnet, pulling the cam clear of the drive pulley and holding it in position. The belt then travels over the drive pulley without the cam in position.

In the preferred embodiment of my invention, the magnetic reed switches 58 and 60 detect the relative positions of the indicators 62 and 64 on each of the belts. Signals from the magnetic reed switches are then used to selectively actuate and deactuate the electromagnets. This is turn selectively moves the cams into and out of engagement with the drive pulleys to change the relative speeds of travel of the belts to thereby maintain corresponding pushers 36 on the belts in substantial transverse alignment.

Figure 5:
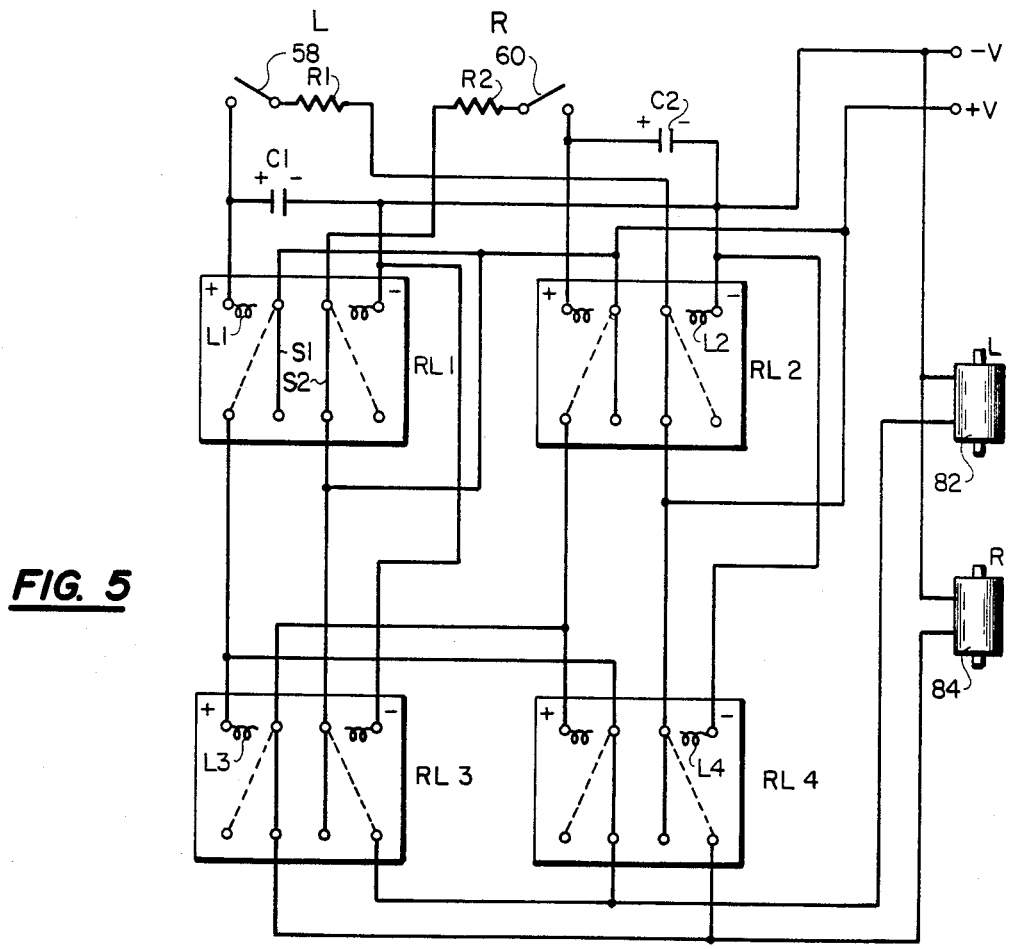
FIG. 5 is a schematic diagram of the control circuit of the preferred embodiment of my conveyor.

Referring to FIG. 5, a preferred embodiment of the control circuit of my invention is illustrated in schematic form. It is adapted to selectively move the spacer arms into and out of engagement with the corresponding drive pulleys to synchronize the movement of the belts. The circuit of FIG. 5 includes four relays RL1, RL2, RL3 and RL4. Each relay has a single coil such as L1 which may be energized to simultaneously move a pair of switches such as S1 and S2 from their open positions illustrated in solid lines to their closed positions illustrated in phantom lines. Resistors R1 and R2 limit the current flow through the reed switches. The circuit of FIG. 5 preferably operates from a low voltage DC power source.

The relays RL1-RL4, reed switches 58 and 60, and electromagnets 82 and 84 are connected as illustrated in FIG. 5 so that they function as hereafter described. When the conveyor is erected from its collapsed configuration the belts 14 and 16 are unfolded and installed around the pulleys so that each pair of their magnetic position indicators such as 62 and 64 are initially in transverse alignment as illustrated in FIG. 2. After initial start-up, the system operates in one of two modes. In the first mode, the left spacer arm is engaged with its drive pulley and the right spacer arm is disengaged with its drive pulley and held by its electromagnet. In the second mode, the left spacer arm is disengaged with its pulley and held by its electromagnet, and the right spacer arm is engaged with its pulley. The circuit of FIG. 5 switches back and forth between the first and second modes whenever the longitudinal distance between two corresponding magnetic position sensors increases beyond a predetermined threshold. This threshold is determined by the amount of time it takes for either of the capacitors C1 or C2 to drain, which may be for example two seconds.

Having described a preferred embodiment of my invention, it should be understood that modifications and adaptations thereof will occur to persons skilled in the art. For example, during the manufacturing process, both belts and drive pulleys may be installed and the motor energized to determine which of the belts has a tendency to get ahead of the other belt. Then only a single spacer arm, cam and electromagnet need be installed on the side of the apparatus having the normally slower moving belt. The circuit may then be configured to selectively engage the spacer as necessary to make the slower moving belt catch up. Optical or other belt position sensing schemes could be utilized. Therefore, in view of these variations, the protection afforded my invention should only be limited in accordance with the following claims.

I claim:
1. A conveyor comprising:
a pair of endless belts;
a forward pair of pulleys;
a rearward pair of pulleys;
means for supporting the forward pulleys for rotation about a first axis;
means for supporting the rearward pulleys for rotation about a second axis parallel to and spaced from the first axis;
each belt being entrained about corresponding ones of the forward and rearward pulleys so that the belts can travel about the pulleys in spaced apart parallel relationship;
means for driving the rearward pulleys at the same rotational speed;
means for sensing the position of each belt about the pulleys; and
control means responsive to the sensing means for selectively increasing and decreasing the circumference of at least one of the rearward pulleys to automatically synchronize the two belts to maintain a predetermined location on one of the belts substantially opposite to a predetermined location on the other one of the belts as the belts travel around the pulleys, the control means including an arm, means for mounting the arm about the axis of the one rearward pulley, a cam mounted to an outer end of the arm, means for pivotally connecting an inner end of the arm to the arm mounting means for permitting the cam to move into and out of engagement with an exposed peripheral surface of the one rearward pulley, and means for moving the arm.

2. A conveyor according to claim 1 wherein the arm moving means includes a spring for biasing the arm so that the cam engages the exposed peripheral surface of the one rearward pulley.

3. A conveyor according to claim 2 wherein the arm moving means includes means for selectively moving the arm to disengage the cam with the exposed peripheral surface of the one rearward pulley.

4. A conveyor according to claim 3 wherein the means for selectively moving the arm to disengage the cam includes an electromagnet.

5. A conveyor according to claim 1 wherein the belt position sensing means includes at least one magnetic position indicators on each belt and a pair of reed switches, each switch being mounted adjacent the path of travel of a corresponding one of the belts to detect the magnetic position indicator on the one belt as it passes by.

6. A conveyor according to claim 1 wherein the control means further includes means for selectively increasing and decreasing the circumference of the other one of the rearward pulleys.

7. A conveyor according to claim 5 wherein the control means includes circuit means connected to the reed switches for actuating an electromotive device to cause the circumference of the one rearward pulley to increase and decrease in response to the detection of one of the magnetic position indicators.

8. A conveyor according to claim 1 wherein the circuit means includes means for inhibiting actuation of the electromotive device within a predetermined time interval of either of the reed switches detecting one of the magnetic position indicators.

9. A conveyor comprising:
a pair of endless belts;
a forward pair of pulleys;
a rearward pair of pulleys;

means for supporting the forward pulleys for rotation about a first axis;

means for supporting the rearward pulleys for rotation about a second axis parallel to and spaced from the first axis;

each belt being entrained about corresponding ones of the forward and rearward pulleys so that the belts can travel about the pulleys in a spaced apart relationship;

means for driving the rearward pulleys at the same rotational speed;

means for sensing the position of each belt about the pulleys;

cam means mounted on the rearward pulley supporting means for movement into and out of engagement with one of the rearward pulleys to selectively vary the effective circumference thereof;

electromotive means for moving the cam means upon application of an energization signal thereto; and a control circuit responsive to the sensing means for selectively applying the energization signal to the electromotive means to thereby automatically synchronize the two belts.

* * * * *